(12) United States Patent
Jung et al.

(10) Patent No.: US 12,743,975 B2
(45) **Date of Patent: *Sep. 22, 2026**

(54) DISPLAY PANEL AND DISPLAY DEVICE INCLUDING THE SAME

(71) Applicant: Samsung Display Co., LTD., Yongin-si (KR)

(72) Inventors: Haegoo Jung, Yongin-si (KR); Yeon-Shil Jung, Yongin-si (KR); Dong-Ho Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/078,495

(22) Filed: Mar. 13, 2025

(65) Prior Publication Data

US 2025/0209948 A1 Jun. 26, 2025

Related U.S. Application Data

(63) Continuation of application No. 18/410,841, filed on Jan. 11, 2024, now Pat. No. 12,277,881.

(30) Foreign Application Priority Data

Apr. 6, 2023 (KR) ........................ 10-2023-0045324

(51) Int. Cl.
*G09G 3/00* (2006.01)
*G06F 3/041* (2006.01)
*G09G 3/3208* (2016.01)

(52) U.S. Cl.
CPC ........... *G09G 3/006* (2013.01); *G06F 3/0418* (2013.01); *G09G 3/3208* (2013.01);
(Continued)

(58) Field of Classification Search
CPC ............................ G09G 3/006; G09G 3/3208
See application file for complete search history.

(56) References Cited

U.S. PATENT DOCUMENTS 7,453,420 B2 11/2008 Watanabe et al.
9,651,838 B2 * 5/2017 Qiao .................. G02F 1/13624
(Continued)

FOREIGN PATENT DOCUMENTS

KR 100576872 B1 5/2006
KR 1020200005353 A 1/2020
(Continued)

*Primary Examiner* — Sardis F Azongha
(74) *Attorney, Agent, or Firm* — CANTOR COLBURN LLP

(57) ABSTRACT

A display panel includes a display panel test circuit including an open-short test transistor including a gate electrode which receives a test gate signal, a first electrode which receives an open-short test voltage, and a second electrode connected to a data line which transmits a data voltage and an electrostatic discharge protection circuit including: a first electrostatic discharge diode including a cathode electrode connected to the data line and an anode electrode which receives a first voltage; a first switching element which determines a minimum voltage of the display panel as the first voltage under a first condition and determines an electrostatic discharge low potential voltage higher than the minimum voltage of the display panel as the first voltage under a second condition; and a second electrostatic discharge diode including a cathode electrode which receives a second voltage and an anode electrode connected to the data line.

20 Claims, 11 Drawing Sheets

(52) U.S. Cl.
CPC . *G09G 2310/0262* (2013.01); *G09G 2330/04* (2013.01); *G09G 2330/12* (2013.01); *G09G 2354/00* (2013.01)

(56) References Cited

U.S. PATENT DOCUMENTS

| | | | |
|---|---|---|---|
| 11,127,352 | B2 | 9/2021 | Kang et al. |
| 11,493,552 | B2 | 11/2022 | Song et al. |
| 2015/0309625 | A1 | 10/2015 | Huang et al. |
| 2016/0240120 | A1 | 8/2016 | Du |

FOREIGN PATENT DOCUMENTS

| | | | |
|---|---|---|---|
| KR | 1020200076096 | A | 6/2020 |
| KR | 102198639 | B1 | 1/2021 |
| KR | 1020210092863 | A | 7/2021 |

* cited by examiner

| YPVX |
| --- |
| YMTL2 |
| YCNT |
| YILD |
| YMTL1 |
| PDL |
| VIA2 |
| SD2 |
| VIA1 |
| SD1 |

DISPLAY PANEL AND DISPLAY DEVICE INCLUDING THE SAME

This application is a continuation of U.S. patent application Ser. No. 18/410,841, filed on Jan. 11, 2024, which claims priority to Korean Patent Application No. 10-2023-0045324, filed on Apr. 6, 2023, and all the benefits accruing therefrom under 35 U.S.C. § 119, the content of which in its entirety is herein incorporated by reference.

BACKGROUND

1. Field

Embodiments of the invention relate to a display panel and a display device including the display panel. More particularly, embodiments of the invention relate to a display panel and a display device including the display panel which include an electrostatic discharge protection circuit.

2. Description of the Related Art

Generally, a display device may include a display panel. The display panel may include data lines and pixels. A display panel test circuit may be disposed around the display panel for lighting test, open-short test, module crack test, or the like of the display panel. In a display device, an electrostatic discharge protection circuit may be disposed around the display panel to protect the display panel from an electrostatic discharge current introduced from an outside. The electrostatic discharge protection circuit may be disposed adjacent to the display panel test circuit. The electrostatic discharge protection circuit may receive a minimum voltage and a maximum voltage. The minimum voltage may be a first gate driving voltage corresponding to a low voltage level of a gate signal. The maximum voltage may be a second gate driving voltage corresponding to a high voltage level of the gate signal. A data voltage and the maximum voltage may be higher than the minimum voltage.

In such a display device, a data line may output the data voltage to an open-short test transistor through a first connection line which transmits the data voltage. The electrostatic discharge protection circuit may receive a minimum voltage through a second connection line. The electrostatic discharge protection circuit may receive the maximum voltage through a third connection line.

SUMMARY

In such a device, when a voltage difference between a data voltage, which is applied to a data line through a first connection line, and a minimum voltage, which is applied to an electrostatic discharge protection circuit through a second connection line, is large, ions may easily move to the first connection line. Accordingly, an oxidation-reduction reaction may easily occur in the first connection line, and corrosion may easily occur in the first connection line. When a voltage difference between the minimum voltage and a maximum voltage applied to the electrostatic discharge protection circuit is large, the corrosion may occur in a third connection line through which the maximum voltage is applied to the electrostatic discharge protection circuit.

Embodiments of the invention provide a display panel for preventing corrosion of lines.

Embodiments of the invention provide a display device including the display panel.

In an embodiment of a display panel according to the invention, the display panel includes a display panel test circuit including an open-short test transistor including a gate electrode which receives a test gate signal, a first electrode which receives an open-short test voltage, and a second electrode connected to a data line which transmits the data voltage and an electrostatic discharge protection circuit including, a first electrostatic discharge diode including a cathode electrode connected to the data line and an anode electrode which receives the first voltage, a first switching element which determines a minimum voltage of the display panel as the first voltage under a first condition and determines an electrostatic discharge low potential voltage higher than the minimum voltage of the display panel as the first voltage under a second condition, and a second electrostatic discharge diode including a cathode electrode which receives a second voltage and an anode electrode connected to the data line.

In an embodiment, the first condition may be satisfied when a driving integrated circuit is electrically connected to the display panel, and the second condition may be satisfied when the driving integrated circuit is not electrically connected to the display panel.

In an embodiment, the electrostatic discharge low potential voltage may be determined based on a minimum gamma reference voltage output from a driving integrated circuit or a flexible circuit board.

In an embodiment, the display panel may further include a touch screen panel, the electrostatic discharge low potential voltage may be a touch ground voltage of a touch ground line electrically connected to the touch screen panel.

In an embodiment, the electrostatic discharge low potential voltage may be a ground voltage of a driving integrated circuit or a flexible circuit board.

In an embodiment, a voltage difference between the electrostatic discharge low potential voltage and the data voltage may be greater than or equal to an offset voltage.

In an embodiment, the first switching element may include a first electrostatic discharge transistor which transmits the electrostatic discharge low potential voltage to the first electrostatic discharge diode based on a first electrostatic discharge gate signal.

In an embodiment, the first switching element may further include a second electrostatic discharge transistor which transmits the minimum voltage of the display panel to the first electrostatic discharge diode based on a second electrostatic discharge gate signal.

In an embodiment, the first condition may be satisfied when the display panel is in a display panel test environment, and the second condition may be satisfied when the display panel is in a user use environment.

In an embodiment, the minimum voltage of the display panel may be a first gate driving voltage corresponding to a low voltage level of a gate signal.

In an embodiment, the display panel may further includes a second switching element which determines a maximum voltage of the display panel as the second voltage under the first condition and determines an electrostatic discharge high potential voltage lower than the maximum voltage of the display panel as the second voltage under the second condition.

In an embodiment, the display panel of the maximum voltage may be a second gate driving voltage corresponding to a high voltage level of a gate signal.

In an embodiment, a distance between a first connection line configured to transmit the data voltage and a second connection line configured to transmit the first voltage may be greater than or equal to an offset distance.

In an embodiment, a distance between a second connection line configured to transmit the first voltage and a third connection line configured to transmit the second voltage may be greater than or equal to an offset distance.

In an embodiment of a display device according to the invention includes a display panel including pixels and a driving integrated circuit, which drives the display panel, or a flexible circuit board. In such an embodiment, the display panel includes: a display panel test circuit including an open-short test transistor including a gate electrode which receives a test gate signal, a first electrode which receives an open-short test voltage, and a second electrode connected to a data line which transmits a data voltage and an electrostatic discharge protection circuit including, a first electrostatic discharge diode including a cathode electrode connected to the data line and an anode electrode which receives a first voltage, a first switching element which determines a minimum voltage of the display panel as the first voltage under a first condition and determines an electrostatic discharge low potential voltage higher than the minimum voltage of the display panel as the first voltage under a second condition, and a second electrostatic discharge diode including a cathode electrode which receives a second voltage and an anode electrode connected to the data line.

In an embodiment, the first condition may be satisfied when the driving integrated circuit is electrically connected to the display panel, and the second condition may be satisfied when the driving integrated circuit is not electrically connected to the display panel.

In an embodiment, the electrostatic discharge low potential voltage may be determined based on a minimum gamma reference voltage output from the driving integrated circuit or the flexible circuit board.

In an embodiment, the display panel may further include a touch screen panel, and the electrostatic discharge low potential voltage may be a touch ground voltage of a touch ground line electrically connected to the touch screen panel.

In an embodiment, the electrostatic discharge low potential voltage may be a ground voltage of the driving integrated circuit or the flexible circuit board.

In an embodiment, a voltage difference between the electrostatic discharge low potential voltage and the data voltage may be greater than or equal to an offset voltage.

According to embodiments of the display panel and the display device, the open short test circuit and the first electrostatic discharge diode of the electrostatic discharge protection circuit may be disposed adjacent or close to each other. In such embodiments, the first switching element may be electrically connected to the first electrostatic discharge diode. In such embodiments, the first switching element may receive the electrostatic discharge low potential voltage higher than the minimum voltage according to conditions. Accordingly, the voltage difference between the data voltage received by the open-short test circuit and the first voltage received by the first electrostatic discharge diode of the electrostatic discharge protection circuit may be selectively reduced, such that corrosion of the first connection line electrically connected to the open-short test circuit may be effectively prevented.

BRIEF DESCRIPTION OF THE DRAWINGS

The above and other features of embodiments of the invention will become more apparent by describing in detailed embodiments thereof with reference to the accompanying drawings, in which.

DETAILED DESCRIPTION

Figure 1:
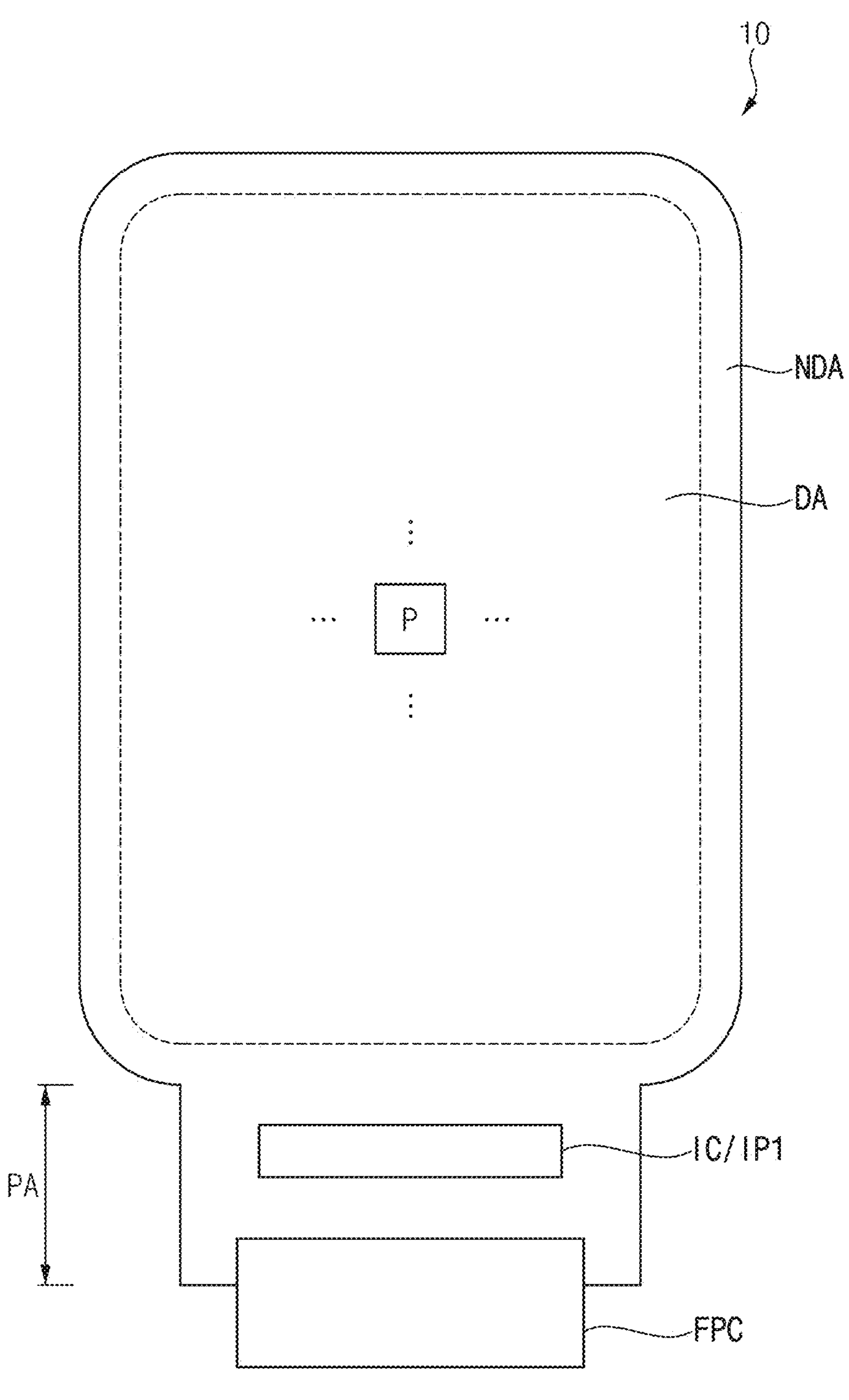
FIG. 1 is a plan view for illustrating a display device according to embodiments of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

Figure 2:
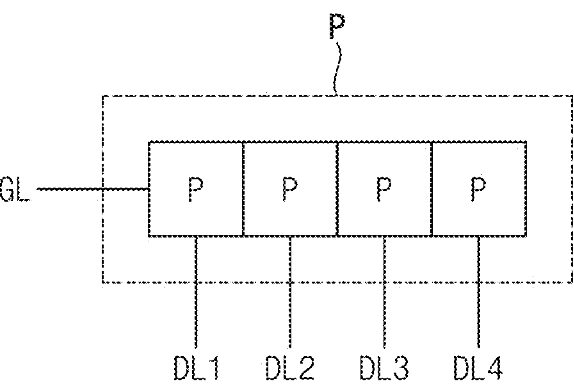
FIG. 2 is a conceptual diagram for illustrating structure of a display panel of FIG. 1.

FIG. 1 is a plan view for illustrating a display device 10 according to embodiments of the invention. FIG. 2 is a conceptual diagram for illustrating structure of a display panel of FIG. 1.

Referring to FIGS. 1 and 2, an embodiment of a display device 10 may include a display panel, a driving integrated circuit IC, a display panel test circuit IP1, and a flexible circuit board FPC.

The display panel may include a display region DA for displaying an image and a peripheral region NDA disposed around the display region DA. In an embodiment, for example, the peripheral region NDA may surround at least a part of the display region DA in a plan view or when viewed in a thickness direction of the display panel. The driving integrated circuit IC for driving pixels P may be disposed in the peripheral region NDA.

The peripheral region NDA may include a pad region PA. In an embodiment, for example, the pad region PA may be adjacent to a lower part of the display region DA.

In an embodiment, for example, the display panel may be an organic light emitting diode display panel including organic light emitting diodes. In an alternative embodiment, for example, the display panel may be a quantum-dot organic light-emitting diode display panel including an organic light-emitting diode and a quantum-dot color filter. In an alternative embodiment, for example, the display panel may be a quantum-dot nano-light emitting diode display panel including a nano-light emitting diode and a quantum-dot color filter. In an alternative embodiment, for example, the display panel may be a liquid crystal display panel including a liquid crystal layer.

In an embodiment, as shown in FIG. 2, the display panel may include a gate line GL, data lines DL1, DL2, DL3, and DL4, and pixels P electrically connected to the gate line GL and the data lines DL1, DL2, DL3, and DL4.

In an embodiment, the driving integrated circuit IC may provide a gate signal, a gamma reference voltage, a data voltage, a power supply voltage, or the like to the pixels P through the flexible circuit board FPC.

In an embodiment, the display panel test circuit IP1 may overlap the driving integrated circuit IC. In an embodiment, for example, the display panel test circuit IP1 may be integrated in the pad region PA of the display panel. The driving integrated circuit IC may be mounted in a form of a chip on a location where the display panel test circuit IP1 is disposed.

The display panel test circuit IP1 may test whether the pixels P of the display panel normally display an image. In an embodiment, for example, before the driving integrated circuit IC is mounted on the display panel, the display panel test circuit IP1 may determine whether the pixels P of the display panel normally display the image.

The display panel test circuit IP1 may be disconnected from the data lines DL1, DL2, DL3, and DL4 after the display panel test is completed. In an embodiment, for example, switches may be formed between the display panel test circuit IP1 and the data lines DL1, DL2, DL3, and DL4. The switches may determine a connection relationship between the display panel test circuit IP1 and the data lines DL1, DL2, DL3, and DL4.

In an open-short test of the data lines DL1, DL2, DL3, and DL4, a vertical strip pattern (voltages corresponding to a vertical strip pattern image) may be applied to the display panel to check whether open or short occurs between the data lines DL1, DL2, DL3, and DL4. In an embodiment, for example, when a high luminance image is applied to a first data line DL1 and a low luminance image is applied to a second data line DL2 adjacent to the first data line DL1, pixels P connected to the first data line DL1 may represent high luminance, and pixels P connected to the second data line DL2 may represent low luminance. However, when the open occurs in the first data line DL1 or the second data line DL2, the open data line may not display a desired grayscale. Also, when the short occurs between the first data line DL1 and the second data line DL2, the pixels P connected to the first data line DL1 and the second data line DL2 partially or entirely may represent a same grayscale as each other.

A configuration and an operation of the display panel test circuit IP1 will hereinafter be described in detail with reference to FIG. 3.

Figure 3:
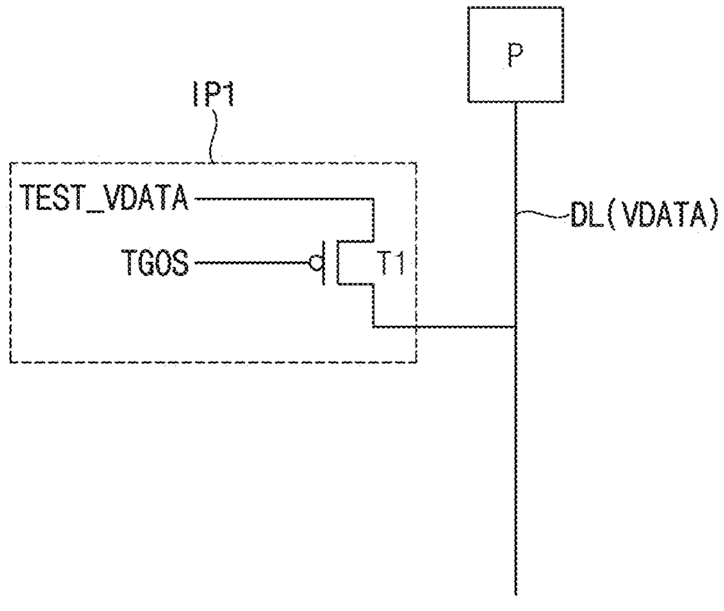
FIG. 3 is a circuit diagram for illustrating a display panel test circuit of FIG. 1.

FIG. 3 is a circuit diagram for illustrating a display panel test circuit IP1 of FIG. 1;

Referring to FIGS. 1 to 3, an embodiment of the display panel test circuit IP1 may include an open-short test circuit T1.

The open-short test circuit T1 may include an open-short test transistor including a gate electrode that receives a test gate signal TGOS, a first electrode that receives an open-short test voltage TEST_VDATA, and a second electrode connected to a data line DL that transmits a data voltage VDATA.

Figure 4:
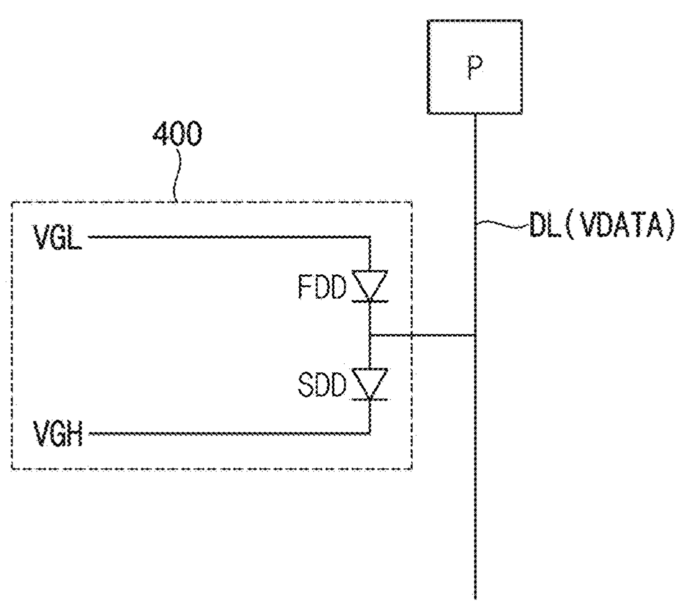
FIG. 4 is a circuit diagram for illustrating an electrostatic discharge protection circuit of FIG. 1.
Figure 5:
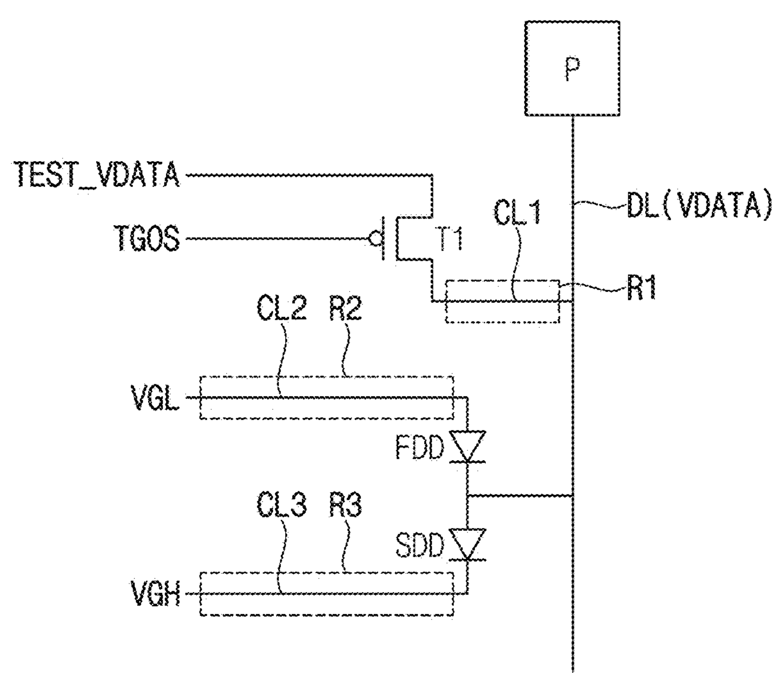
FIG. 5 is a circuit diagram for illustrating the display panel test circuit of FIG. 1 and the electrostatic discharge protection circuit of FIG. 1.
Figure 6:
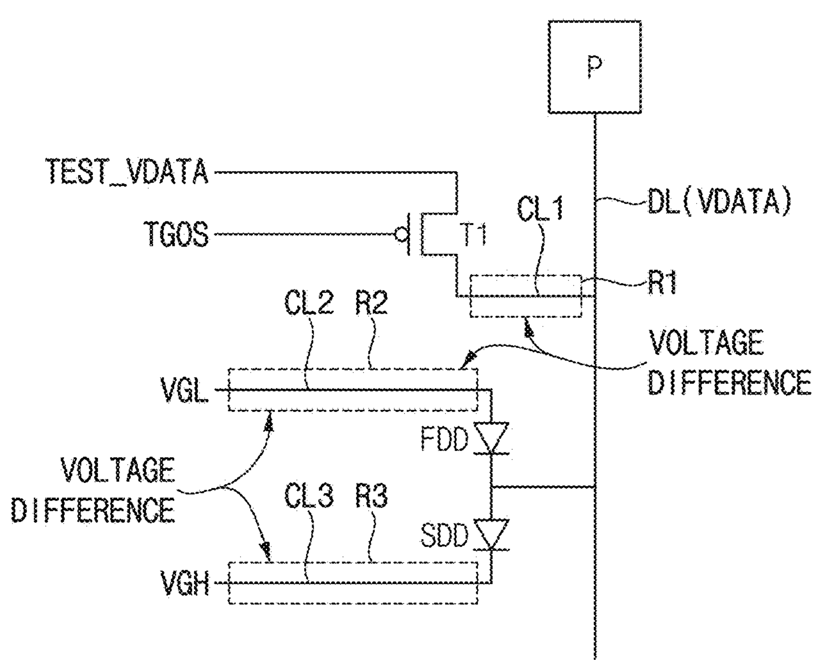
FIG. 6 is a circuit diagram for illustrating a voltage difference between a first connection line and a second connection line in FIG. 5 and a voltage difference between the second connection line and a third connection line in FIG. 5.

FIG. 4 is a circuit diagram for illustrating an electrostatic discharge protection circuit 400 of FIG. 1. FIG. 5 is a circuit diagram for illustrating the display panel test circuit IP1 of FIG. 1 and the electrostatic discharge protection circuit 400 of FIG. 1. FIG. 6 is a circuit diagram for illustrating a voltage difference between a first connection line CL1 and a second connection line CL2 in FIG. 5 and a voltage difference between the second connection line CL2 and a third connection line CL3 in FIG. 5;

Referring to FIGS. 1 to 6, an embodiment of an electrostatic discharge protection circuit 400 may be disposed adjacent or close to the display panel test circuit IP1 including the open-short test circuit T1. In an embodiment, static electricity may be introduced through the data line DL. The static electricity introduced through the data line DL may damage the pixels P directly connected to the data line DL. The electrostatic discharge protection circuit 400 may effectively prevent the pixels P from being damaged by the static electricity by discharging the static electricity. In an embodiment, one or more electrostatic discharge protection circuits 400 may be connected to the data line DL to discharge the static electricity introduced through the data line DL.

In an embodiment, the electrostatic discharge protection circuit 400 may include a first electrostatic discharge diode FDD and a second electrostatic discharge diode SDD. The electrostatic discharge protection circuit 400 may receive a minimum voltage VGL and a maximum voltage VGH. The data voltage VDATA and the maximum voltage VGH may be higher than the minimum voltage VGL. The minimum voltage VGL may be a first gate driving voltage corresponding to a low voltage level of the gate signal. The maximum voltage VGH may be a second gate driving voltage corresponding to a high voltage level of the gate signal.

When the static electricity is less than the minimum voltage VGL, the static electricity may be discharged through the first electrostatic discharge diode FDD. When the static electricity is greater than the maximum voltage VGH, the static electricity may be discharged through the second static discharge diode SDD.

In an embodiment, as shown in FIG. 6, when a voltage difference between the minimum voltage VGL and the data voltage VDATA is large, ions may move easily to the first connection line CL1 for transmitting the data voltage VDATA having a higher voltage than the minimum voltage VGL. Accordingly, an oxidation-reduction reaction may easily occur in the first connection line CL1, and corrosion may easily occur in the first connection line CL1. When a voltage difference between the minimum voltage VGL and the maximum voltage VGH is large, the corrosion may occur in the third connection line CL3 for transmitting the maximum voltage VGH, which is higher than the minimum voltage VGL.

In an embodiment, the voltage difference between the minimum voltage VGL and the data voltage VDATA may be reduced by adjusting the minimum voltage VGL to prevent such corrosions. In an embodiment, the voltage difference between the minimum voltage VGL and the maximum voltage VGH may be reduced by adjusting the minimum voltage VGL to prevent such corrosions. In an embodiment, the voltage difference between the minimum voltage VGL and the maximum voltage VGH may be reduced by adjusting the maximum voltage VGH to prevent such corrosions. In an embodiment, a distance of lines, to which voltages are applied, may be adjusted to prevent such corrosions.

Figure 7:
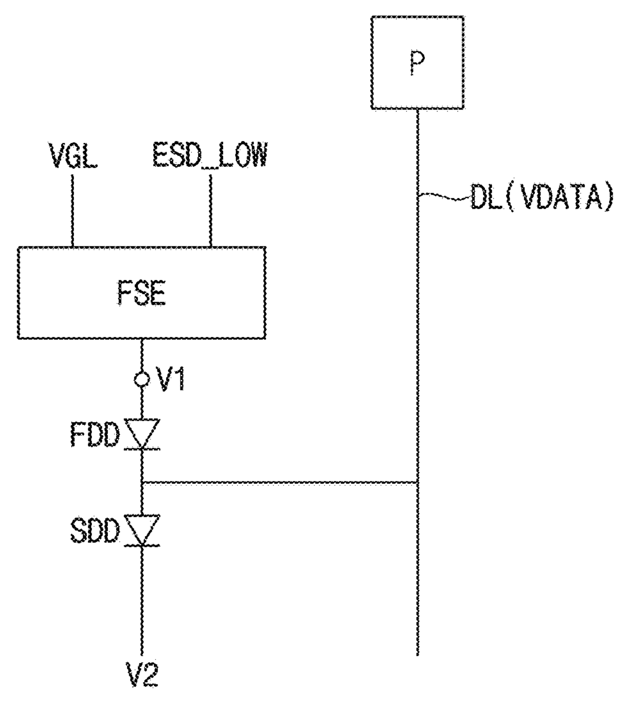
FIG. 7 is a circuit diagram for illustrating an electrostatic discharge protection circuit according to an embodiment of the invention.

FIG. 7 is a circuit diagram for illustrating an electrostatic discharge protection circuit 400 according to an embodiment of the invention.

Referring to FIGS. 1 to 7, an embodiment of the electrostatic discharge protection circuit 400 may include the first electrostatic discharge diode FDD, the second electrostatic discharge diode SDD, and a first switching element FSE.

In such an embodiment, the first electrostatic discharge diode FDD may include a cathode electrode connected to the data line DL and an anode electrode that receives a first voltage V1. The second electrostatic discharge diode SDD may include a cathode electrode that receives a second voltage V2 and an anode electrode connected to the data line DL.

The first switching element FSE may determine the minimum voltage VGL of the display panel as the first voltage V1, which is an output voltage thereof, under a first condition, and determine an electrostatic discharge low potential voltage ESD_LOW higher than the minimum voltage VGL of the display panel as the first voltage V1 under a second condition In such an embodiment, the display panel test circuit IP1 including the open-short test circuit T1 may be effectively prevented from being corroded by reducing a voltage difference between the data voltage VDATA and the first voltage V1.

Figure 8:
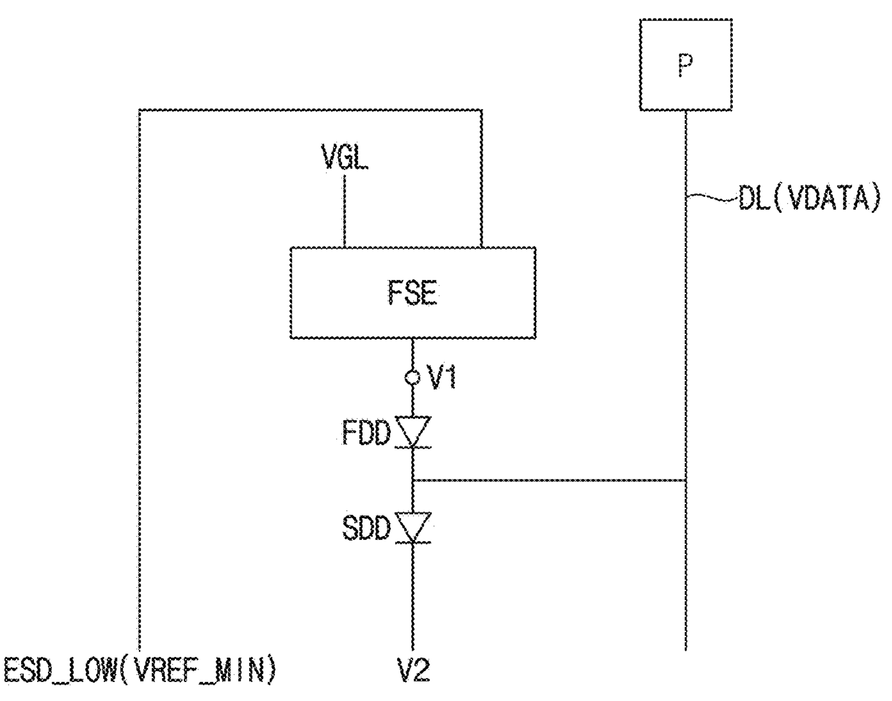
FIG. 8 is a circuit diagram for illustrating an example of an electrostatic discharge low potential voltage of FIG. 7.

FIG. 8 is a circuit diagram for illustrating an example of an electrostatic discharge low potential voltage ESD_LOW of FIG. 7;

Referring to FIGS. 1 to 8, in an embodiment, the electrostatic discharge low potential voltage ESD_LOW may be determined based on a minimum gamma reference voltage VGREF_MIN output from the driving integrated circuit IC or the flexible circuit board FPC. The minimum gamma reference voltage VGREF_MIN may be a minimum value of gamma reference voltages. In an embodiment, for example, the minimum voltage VGL may be −8 volts (V), the maximum voltage VGH may be 8 V, and the data voltage VDATA may be in a range of 2 V to 6 V. The electrostatic discharge low potential voltage ESD_LOW may be determined based on the minimum gamma reference voltage VGREF_MIN higher than the minimum voltage VGL and the maximum voltage VGH and lower than the data voltage VDATA. In an embodiment, for example, the minimum gamma reference voltage VGREF_MIN may be 0.5 V, and the electrostatic discharge low potential voltage ESD_LOW may be the minimum gamma reference voltage VGREF_MIN. In an embodiment, for example, the minimum gamma reference voltage VGREF_MIN may be 0.5 V, and the electrostatic discharge low potential voltage ESD_LOW may be 0.5 V lower than the minimum gamma reference voltage VGREF_MIN.

In such an embodiment, the display panel test circuit IP1 including the open-short test circuit T1 may be effectively prevented from being corroded by reducing the voltage difference between the data voltage VDATA and the first voltage V1.

Figure 9:
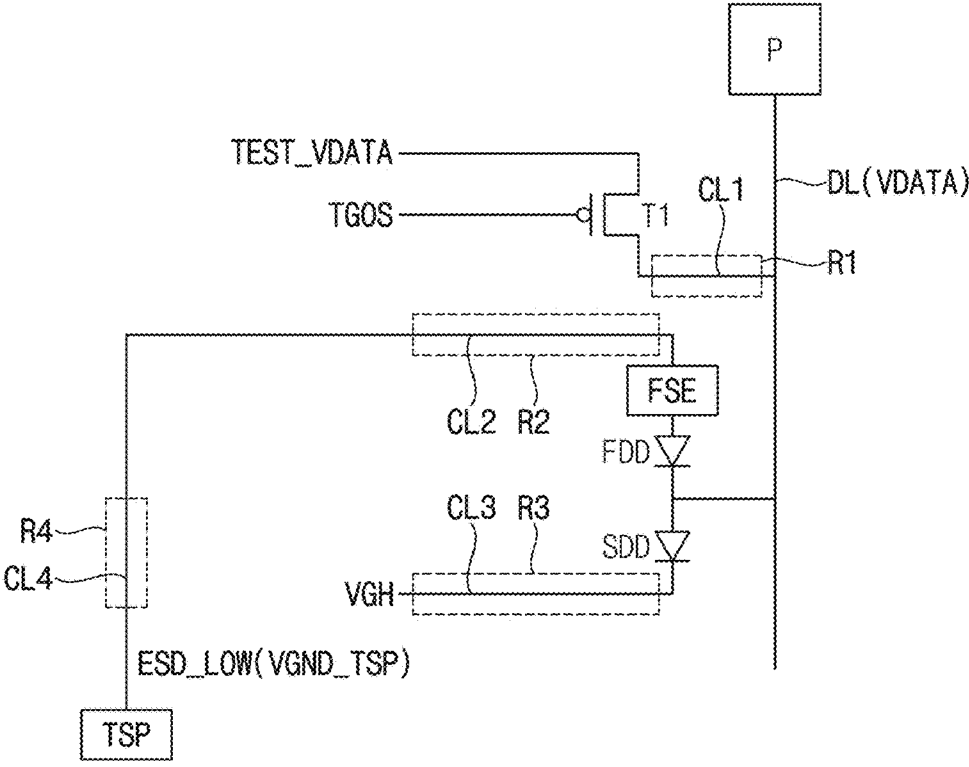
FIG. 9 is a circuit diagram for illustrating an example of the electrostatic discharge low potential voltage of FIG. 7.
Figures 10, 11:
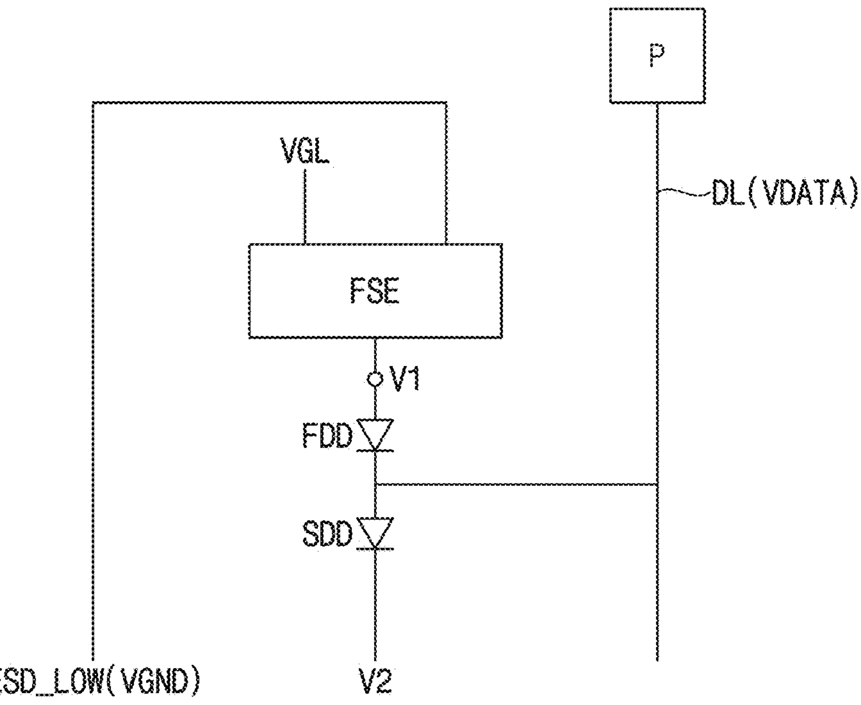
FIG. 10 is a cross-sectional view for illustrating first to fourth connection lines.
FIG. 11 is a circuit diagram for illustrating an example of the electrostatic discharge low potential voltage of FIG. 7.

FIG. 9 is a circuit diagram for illustrating an example of the electrostatic discharge low potential voltage ESD_LOW of FIG. 7. FIG. 10 is a cross-sectional view for illustrating first to fourth connection lines CL1, CL2, CL3, and CL4.

Referring to FIGS. 1 to 10, in an embodiment, the display panel may further include a touch screen panel TSP, and the electrostatic discharge low potential voltage ESD_LOW may be a touch ground voltage VGND_TSP of a ground line (or a fourth connection line) CL4 electrically connected to the touch screen panel TSP. In an embodiment, for example, the minimum voltage VGL may be −8 V, the maximum voltage VGH may be 8 V, and the data voltage VDATA may be in a range of 2 V to 6 V. In an embodiment, for example, the touch ground voltage VGND_TSP may be 0 V, and the electrostatic discharge low potential voltage ESD_LOW may be the touch ground voltage VGND_TSP.

In an embodiment, as shown in FIG. 10, in the first to fourth connection lines CL1 to CL4, a source-drain electrode SD1, a first via insulating layer VIA1, a connection electrode SD2, and a second via insulating layer VIA2, a pixel defining layer PDL, a first touch electrodeYMTL1, first touch insulating layers YCNT and YILD, a second touch electrode YMTL2, and a second touch insulating layer YPVX may sequentially formed. The first connection line CL1 may be connected to the open-short test circuit T1. The first connection line CL1 may be disposed in a first region R1 and may be disposed in a same layer as the source-drain electrode SD1. The second connection line CL2 may be connected to the anode electrode of the first electrostatic discharge diode FDD. The second connection line CL2 may be disposed in the second region R2 and may be disposed in a same layer as the source-drain electrode SD1. The third connection line CL3 may be connected to the cathode electrode of the second electrostatic discharge diode SDD. The third connection line CL3 may be disposed in the third region R3 and may be disposed in a same layer as the source-drain electrode SD1. The fourth connection line CL4 may be connected to the touch screen panel TSP. The fourth connection line CL4 may be disposed in the fourth region R4 and may be disposed in a same layer the second touch electrode YMTL2. In an embodiment, the fourth connection line (or the touch ground line) CL4 may be connected to the source-drain electrode SD1 through a contact hole in the fourth region R4. In an embodiment, the second and fourth connection lines CL2 and CL4 may be the touch ground line CL4 connected to the source-drain electrode SD1 through a contact hole in the second region R2. Since the first touch insulating layer YCNT and YILD may be disposed between the source-drain electrode SD1 and the second touch electrode YMTL2, the ions may be effectively prevented from moving between the source-drain electrode SD1 and the second touch electrode YMTL2.

In such an embodiment, as described above, the display panel test circuit IP1 including the open-short test circuit T1 may be effectively prevented from being corroded by reducing the voltage difference between the data voltage VDATA and the first voltage V1.

FIG. 11 is a circuit diagram for illustrating an example of the electrostatic discharge low potential voltage ESD_LOW of FIG. 7;

Referring to FIGS. 1 to 11, in an embodiment, the electrostatic discharge low potential voltage ESD_LOW may be a ground voltage VGND of the driving integrated circuit IC or the flexible circuit board FPC. In an embodiment, for example, the minimum voltage VGL may be −8 V, the maximum voltage VGH may be 8 V, and the data voltage VDATA may be in a range of 2 V to 6 V. In an embodiment, for example, the ground voltage VGND may be 0V, and the electrostatic discharge low potential voltage ESD_LOW may be the ground voltage VGND.

In such an embodiment, the display panel test circuit IP1 including the open-short test circuit T1 may be effectively prevented from being corroded by reducing the voltage difference between the data voltage VDATA and the first voltage V1.

Figure 12:
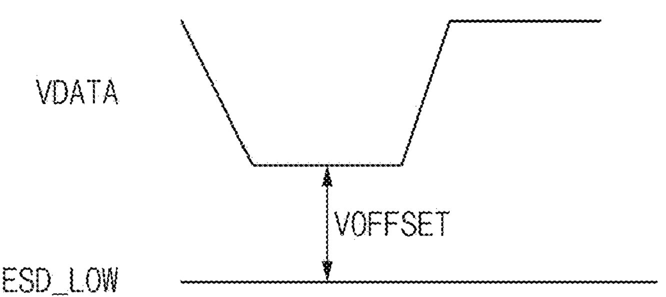
FIG. 12 is a conceptual diagram for illustrating an offset voltage.

FIG. 12 is a conceptual diagram for illustrating an offset voltage VOFFSET.

Referring to FIGS. 1 to 12, in an embodiment, when the data voltage VDATA is equal to the electrostatic discharge low potential voltage ESD_LOW, the first electrostatic discharge diode FDD may be turned on. Therefore, when the first electrostatic discharge diode FDD is turned on, the pixel P may not emit light as much as a grayscale corresponding to the data voltage VDATA. Accordingly, in such an embodiment, the voltage difference between the electrostatic discharge low potential voltage ESD_LOW and the data voltage VDATA may be greater than or equal to the offset voltage VOFFSET to emit light as much as a grayscale corresponding to the data voltage VDATA. The offset voltage VOFFSET may be a minimum voltage difference between the data voltage VDATA and the electrostatic discharge low potential voltage ESD_LOW for preventing the first electrostatic discharge diode FDD from turning on.

Figure 13:
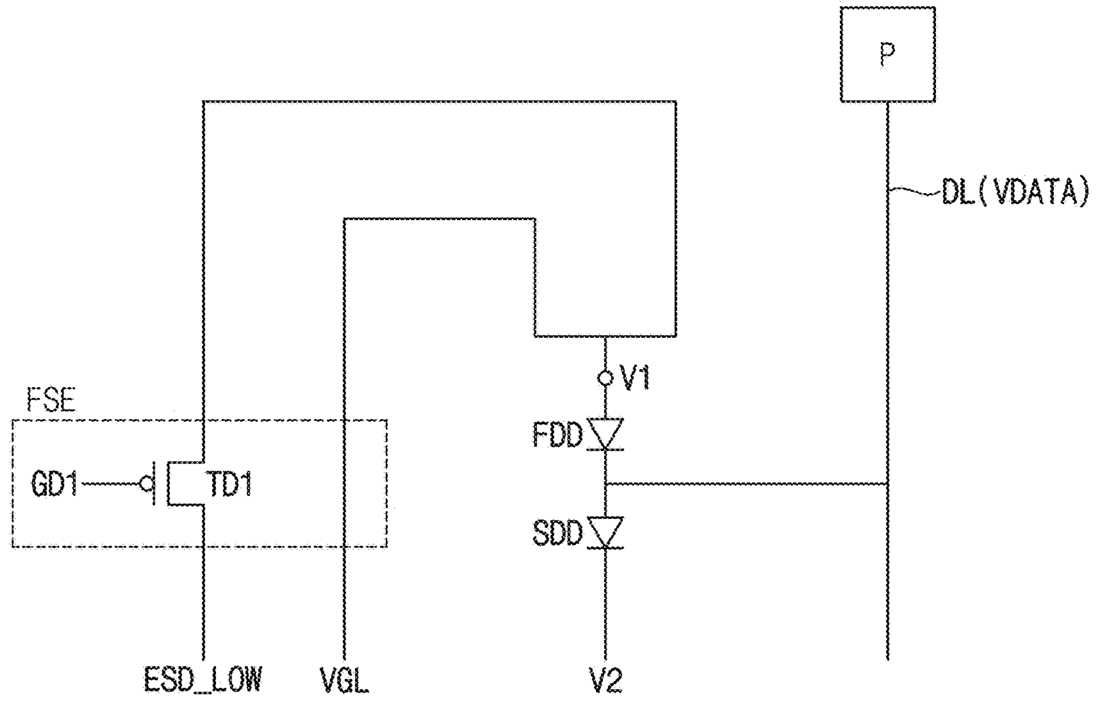
FIG. 13 is a circuit diagram for illustrating an example of a first switching element of FIG. 7.
Figure 14:
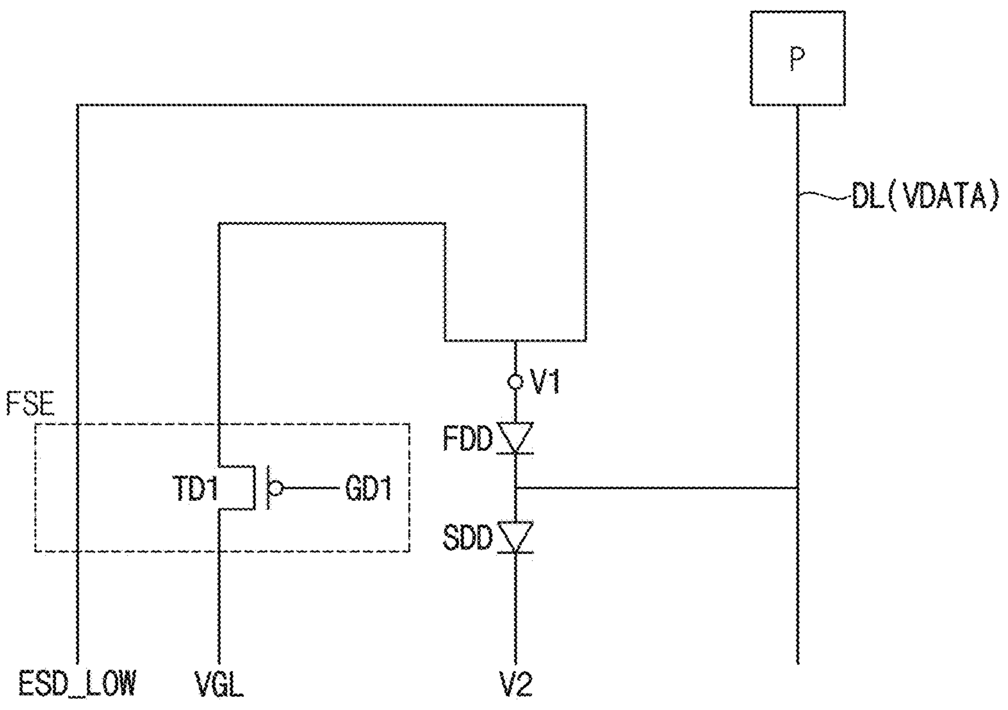
FIG. 14 is a circuit diagram for illustrating an example of the first switching element of FIG. 7.

FIG. 13 is a circuit diagram for illustrating an example of a first switching element FSE of FIG. 7. FIG. 14 is a circuit diagram for illustrating an example of the first switching element FSE of FIG. 7.

Referring to FIGS. 1 to 14, in an embodiment, the first switching element FSE may determine the minimum voltage VGL of the display panel as the first voltage V1 under the first condition and determine the electrostatic discharge low potential voltage ESD_LOW higher than the minimum voltage VGL of the display panel as the first voltage V1 under the second condition.

In an embodiment, the first condition is satisfied when the driving integrated circuit IC is electrically connected to the display panel, and the second condition is satisfied when the driving integrated circuit IC is not electrically connected to the display panel. As shown FIG. 13, the first switching element FSE may include a first electrostatic discharge transistor TD1 which transmits the electrostatic discharge low potential voltage ESD_LOW to the first electrostatic discharge diode FDD based on (or in response to) the first electrostatic discharge gate signal GD1. In this case, the first electrostatic discharge gate signal GD1 may be output by the driving integrated circuit IC or the flexible circuit board FPC. Under the first condition, the first electrostatic discharge transistor TD1 may be turned off by the first electrostatic discharge gate signal GD1, and the minimum voltage VGL may be transmitted to the first electrostatic discharge diode FDD. Therefore, by securing the voltage difference between the data voltage VDATA and the first voltage V1, performance of discharging static electricity of the first electrostatic discharge diode FDD may be secured. Under the second condition, the first electrostatic discharge transistor TD1 may be turned on by the first electrostatic discharge gate signal GD1, and the first switching element FSE may be turned on based on the first electrostatic discharge gate signal GD1. Thus, the electrostatic discharge low potential voltage ESD_LOW may be transmitted to the first electrostatic discharge diode FDD. Therefore, the display panel test circuit IP1 including the open-short test circuit T1 may be effectively prevented from being corroded by reducing the voltage difference between the data voltage VDATA and the first voltage V1.

In an alternative embodiment, as shown FIG. 14, the first switching element FSE may include electrostatic discharge transistor TD1 which transmits the minimum voltage VGL to the first electrostatic discharge diode FDD based on a first electrostatic discharge gate signal GD1. In such an embodiment, the first switching element FSE may be substantially similar to the first switching element FSE of FIG. 13 except that the first switching element FSE controls the transmission of the minimum voltage VGL.

Figure 15:
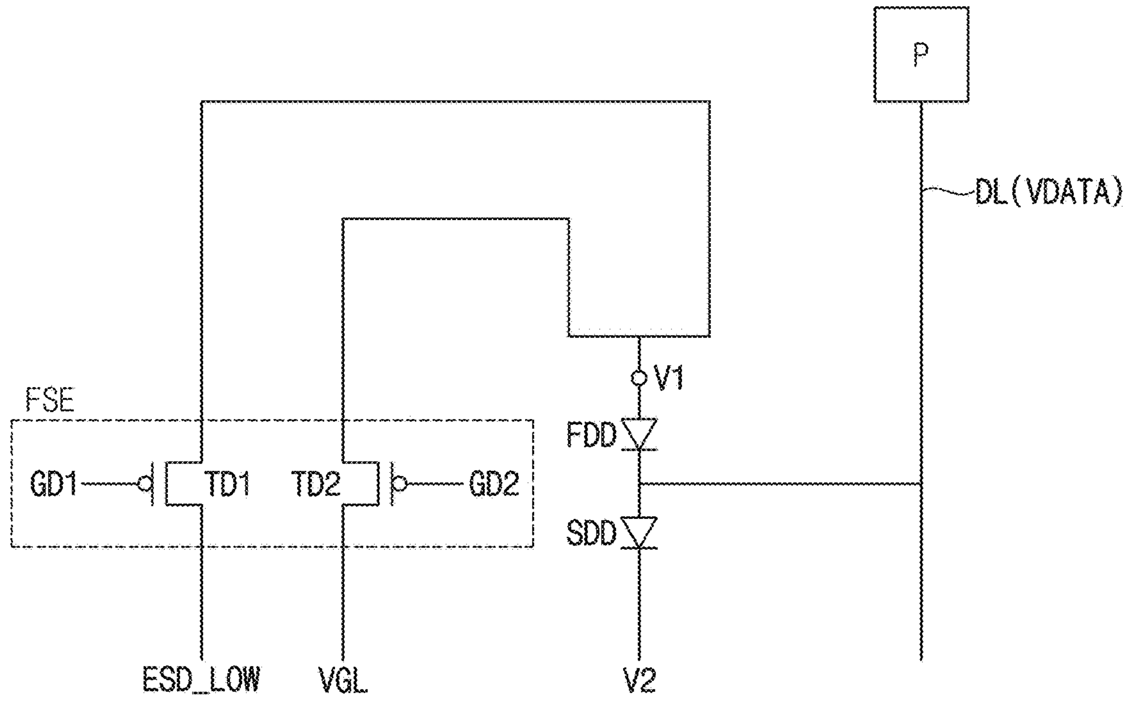
FIG. 15 is a circuit diagram for illustrating an example of the first switching element of FIG. 7.

FIG. 15 is a circuit diagram for illustrating an example of the first switching element FSE of FIG. 7.

Referring to FIGS. 1 to 15, the first switching element FSE may determine the minimum voltage VGL of the display panel as the first voltage V1 under the first condition and determine the electrostatic discharge low potential voltage ESD_LOW higher than the minimum voltage VGL of the display panel as the first voltage V1 under the second condition.

In an embodiment, the first condition may be satisfied when the display panel is in a display panel test environment, and the second condition may be satisfied when the display panel is in a user use environment. In such an embodiment, as shown FIG. 15, the first switching element FSE may further include a second electrostatic discharge transistor TD2 which transmits the minimum voltage VGL to the first electrostatic discharge diode FDD based on a second electrostatic discharge gate signal GD2. In this case, the first electrostatic discharge gate signal GD1 and the second electrostatic discharge gate signal GD2 may be output by the driving integrated circuit IC or the flexible circuit board FPC. Under the first condition, the first electrostatic discharge transistor TD1 may be turned off by the first electrostatic discharge gate signal GD1, and the second electrostatic discharge transistor TD2 may be turned off by the second electrostatic discharge gate signal GD2, and the first switching element FSE may transmit the minimum voltage VGL to the first electrostatic discharge diode FDD. Therefore, the performance of discharging static electricity of the first electrostatic discharge diode FDD may be secured by securing the voltage difference between the data voltage VDATA and the first voltage V1. Under the second condition, the first electrostatic discharge transistor TD1 may be turned on by the first electrostatic discharge gate signal GD1 and the second electrostatic discharge transistor TD2 may be turned on by the second electrostatic discharge gate signal GD2, the first switching element FSE may transmit the electrostatic discharge low potential voltage ESD_LOW to the first electrostatic discharge diode FDD. Therefore, the display panel test circuit IP1 including the open-short test circuit T1 may be effectively prevented from being corroded by reducing the voltage difference between the data voltage VDATA and the first voltage V1.

Figure 16:
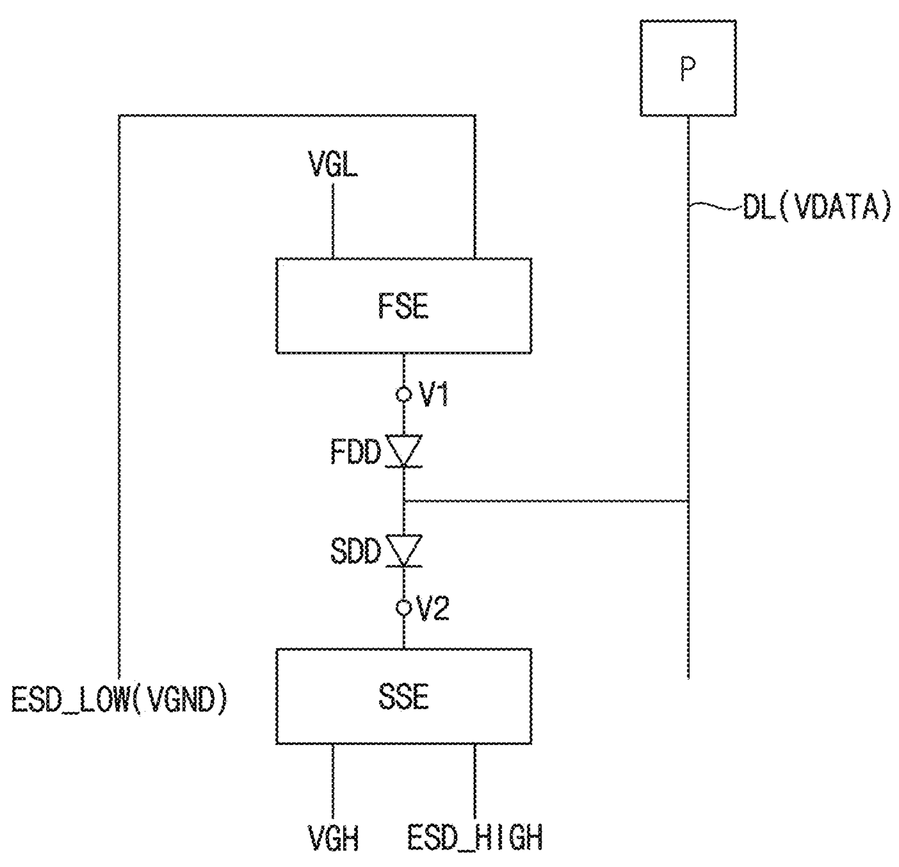
FIG. 16 is a circuit diagram for illustrating an electrostatic discharge protection circuit according to an embodiment of the invention.

FIG. 16 is a circuit diagram for illustrating an electrostatic discharge protection circuit 400 according to an embodiment of the invention;

Referring to FIGS. 1 to 16, in an embodiment, the electrostatic discharge protection circuit 400 may further include a second switching element SSE which determines the maximum voltage VGH of the display panel as the second voltage V2 under the first condition and determine the electrostatic discharge high potential voltage ESD_HIGH lower than the maximum voltage VGH of the display panel under the second condition. In an embodiment, for example, the minimum voltage VGL may be −8 V and the maximum voltage VGH may be 8 V. The electrostatic discharge high potential voltage ESD_HIGH may be determined as a voltage lower than the maximum voltage VGH.

In such an embodiment, the display panel test circuit IP1 including the open-short test circuit T1 may be effectively prevented from being corroded by reducing the voltage difference between the data voltage VDATA and the second voltage V2.

Figure 17:
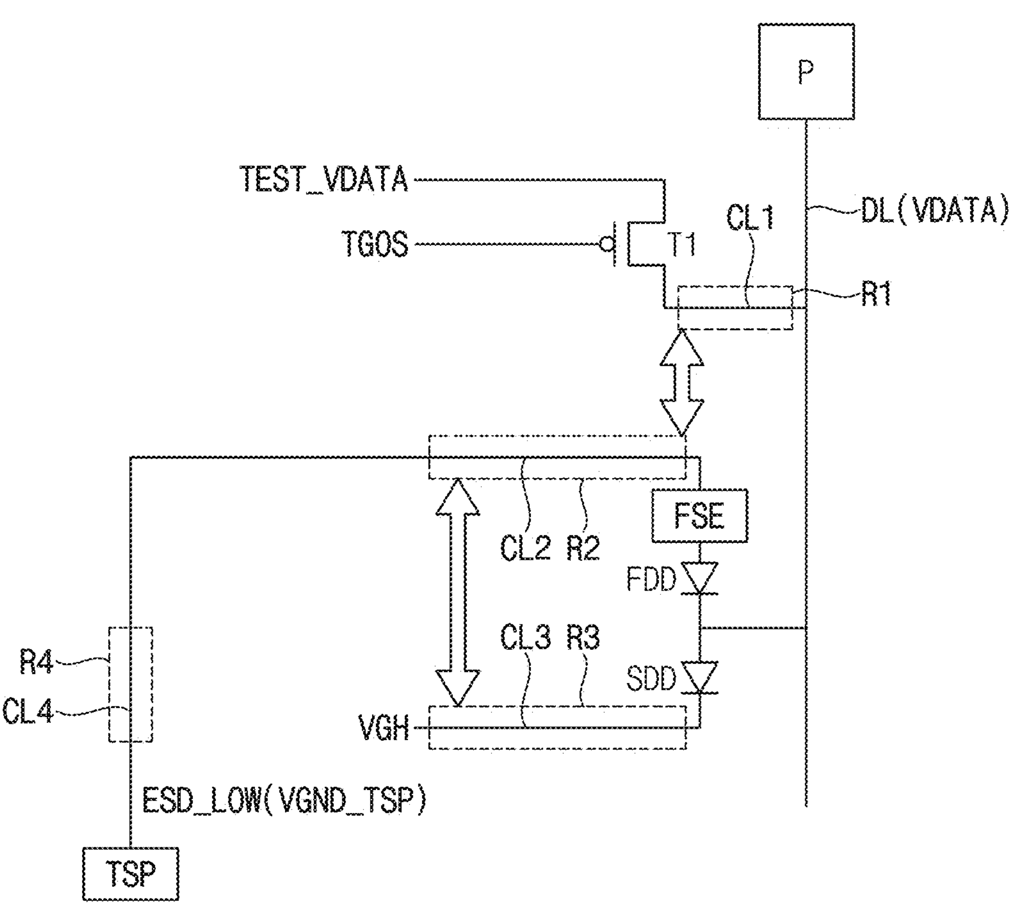
FIG. 17 is a circuit diagram for illustrating an electrostatic discharge protection circuit of FIG. 7.

FIG. 17 is a circuit diagram for illustrating an electrostatic discharge protection circuit of FIG. 7.

Referring to FIGS. 1 to 17, in an embodiment, the distance between the first connection line CL1 and the second connection line CL2 may be greater than or equal to the offset distance DOFFSET. The distance between the second connection line CL2 and the third connection line CL3 may be greater than or equal to the offset distance DOFFSET. The offset distance DOFFSET may be a minimum distance between lines to prevent the corrosion.

Despite the voltage difference between the data voltage VDATA and the first voltage V1, when the distance between the lines increases, corrosion may occur less. Therefore, despite the voltage difference between the data voltage VDATA and the first voltage V1, the display panel test circuit IP1 including the open-short test circuit T1 may be effectively prevented from being corroded by securing the distance between the lines.

Figure 18:
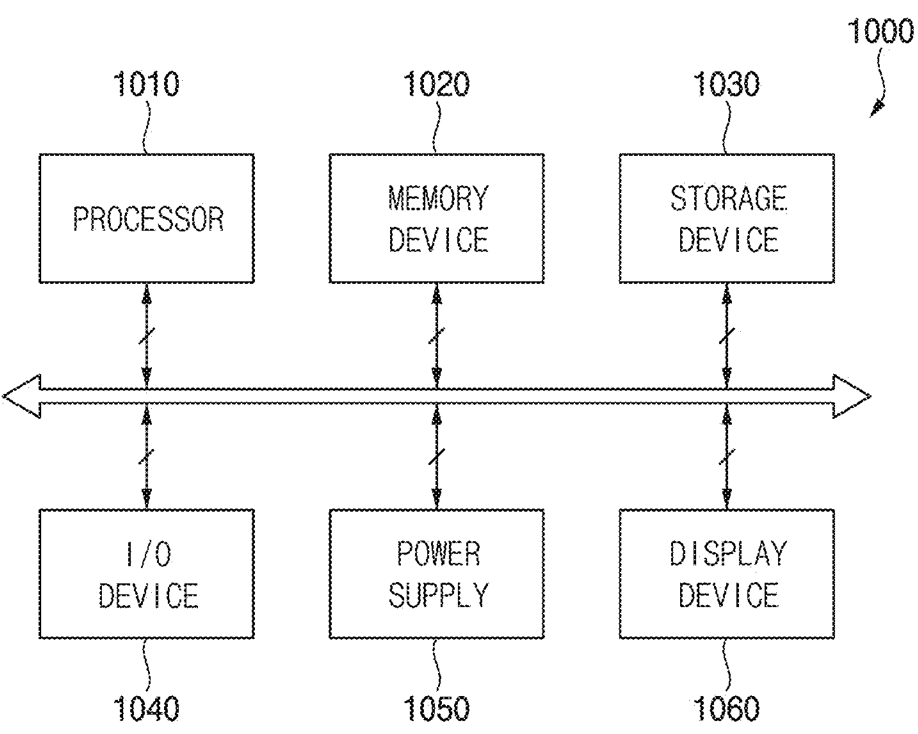
FIG. 18 is a block diagram for illustrating an electronic device according to embodiments of the invention.
Figure 19:
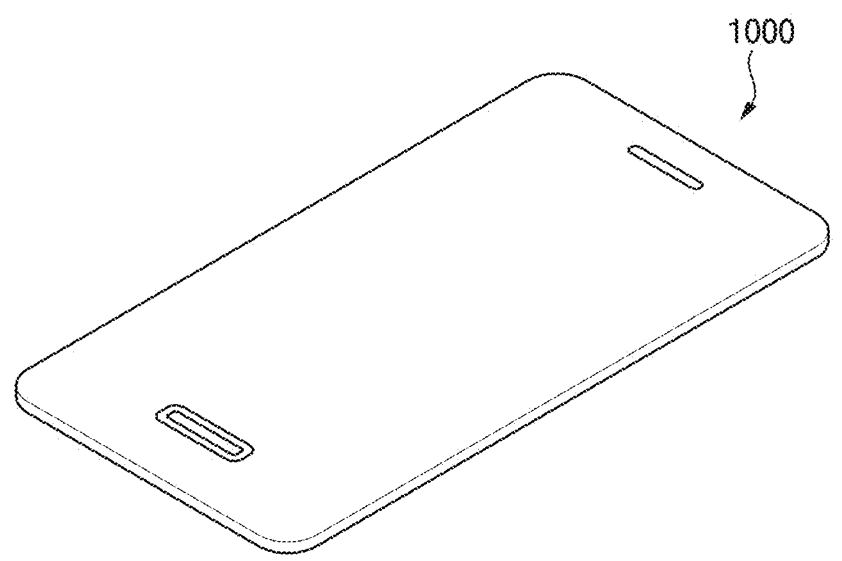
FIG. 19 is a diagram for illustrating an embodiment in which the electronic device of FIG. 18 is implemented as a smart phone.

FIG. 18 is a block diagram for illustrating an electronic device 1000 according to embodiments of the invention. FIG. 19 is a diagram for illustrating an embodiment in which the electronic device of FIG. 18 is implemented as a smart phone.

Referring to FIGS. 18 and 19, an embodiment of the electronic device 1000 may include a processor 1010, a memory device 1020, a storage device 1030, an input/output (I/O) device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus (USB) device, other electronic device, and the like.

In an embodiment, as illustrated in FIG. 19, the electronic device 1000 may be implemented as a smart phone. However, the electronic device 1000 is not limited thereto. In an alternative embodiment, for example, the electronic device 1000 may be implemented as a cellular phone, a video phone, a smart pad, a smart watch, a tablet personal computer (PC), a car navigation system, a computer monitor, a laptop, a head mounted display (HMD) device, or the like.

The processor 1010 may perform various computing functions. The processor 1010 may be a micro processor, a central processing unit (CPU), an application processor (AP), or the like. The processor 1010 may be coupled to other components via an address bus, a control bus, a data bus, or the like. Further, the processor 1010 may be coupled to an extended bus such as a peripheral component interconnection (PCI) bus.

The memory device 1020 may store data for operations of the electronic device 1000. In an embodiment, for example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, or the like.

The storage device 1030 may include a solid state drive (SSD) device, a hard disk drive (HDD) device, a CD-ROM device, or the like.

The I/O device 1040 may include an input device such as a keyboard, a keypad, a mouse device, a touch-pad, a touch-screen, and the like, and an output device such as a printer, a speaker, or the like. In some embodiments, the I/O device 1040 may include the display device 1060.

The power supply 1050 may provide power for operations of the electronic device 1000.

The display device 1060 may be connected to other components through buses or other communication links.

The inventions may be applied to any display device and any electronic device including the touch panel. In an embodiment, for example, the inventions may be applied to a mobile phone, a smart phone, a tablet computer, a digital television (TV), a three-dimensional (3D) TV, a PC, a home appliance, a laptop computer, a personal digital assistant (PDA), a portable multimedia player (PMP), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel including pixels, a display panel test circuit, and an electrostatic discharge protection circuit which are connected to a data line which transmits a data voltage; and a flexible circuit board which drives the display panel and outputs an electrostatic discharge low potential voltage, wherein the display panel test circuit includes an open-short test transistor including a gate electrode which receives a test gate signal, a first electrode which receives an open-short test voltage, and a second electrode connected to the data line, wherein the electrostatic discharge protection circuit includes:

a first electrostatic discharge diode including a cathode electrode connected to the data line and an anode electrode which receives a first voltage;

a first switching element which determines a minimum voltage of the display panel as the first voltage under a first condition and determines the electrostatic discharge low potential voltage higher than the minimum voltage of the display panel as the first voltage under a second condition; and a second electrostatic discharge diode including a cathode electrode which receives a second voltage and an anode electrode connected to the data line, and wherein a voltage difference between the data voltage and the electrostatic discharge low potential voltage is less than a voltage difference between the data voltage and the minimum voltage of the display panel.

2. The display device of claim 1, further comprising:

a pad which transmits the electrostatic discharge low potential voltage and is connected to the electrostatic discharge protection circuit and the flexible circuit board.

3. The display device of claim 1, wherein a distance between a first connection line connected to the data line and the open-short transistor and a second connection line, which transmits the first voltage and is connected to the first switching element, is greater than or equal to an offset distance.

4. The display device of claim 1, wherein a distance between a second connection line, which transmits the first voltage and is connected to the first switching element, and a third connection line, which transmits the second voltage and is connected to the second electrostatic discharge diode, is greater than or equal to an offset distance.

5. The display device of claim 1, wherein the electrostatic discharge protection circuit further includes a second switching element which determines a maximum voltage of the display panel as the second voltage under the first condition and determines an electrostatic discharge high potential voltage lower than the maximum voltage of the display panel under the second condition, and wherein the display panel test circuit, the first switching element, and the second switching element are arranged sequentially along the data line.

6. The display device of claim 1, wherein the electrostatic discharge protection circuit further includes a second switching element which determines a maximum voltage of the display panel as the second voltage under the first condition and determines an electrostatic discharge high potential voltage lower than the maximum voltage of the display panel under the second condition, and wherein the display panel test circuit, the second switching element, and the first switching element are arranged sequentially along the data line.

7. The display device of claim 1, wherein the electrostatic discharge low potential voltage is determined based on a minimum gamma reference voltage output from the flexible circuit board.

8. The display device of claim 1, wherein the electrostatic discharge low potential voltage is a ground voltage of the flexible circuit board.

9. The display device of claim 1, wherein a voltage difference between the electrostatic discharge low potential voltage and the data voltage is greater than or equal to an offset voltage.

10. The display device of claim 1, wherein the first switching element includes a first electrostatic discharge transistor which transmits the electrostatic discharge low potential voltage to the first electrostatic discharge diode based on a first electrostatic discharge gate signal.

11. The display device of claim 10, wherein the first switching element further includes a second electrostatic discharge transistor which transmits the minimum voltage of the display panel to the first electrostatic discharge diode based on a second electrostatic discharge gate signal.

12. The display device of claim 11, wherein the first condition is satisfied when the display panel is in a display panel test environment, and the second condition is satisfied when the display panel is in a user use environment.

13. The display device of claim 1, wherein the minimum voltage of the display panel is a first gate driving voltage corresponding to a low voltage level of a gate signal.

14. The display device of claim 1, wherein the electrostatic discharge protection circuit further includes a second switching element which determines a maximum voltage of the display panel as the second voltage under the first condition and determines an electrostatic discharge high potential voltage lower than the maximum voltage of the display panel under the second condition, and wherein the flexible circuit board outputs the electrostatic discharge high potential voltage.

15. The display device of claim 14, wherein the maximum voltage of the display panel is a second gate driving voltage corresponding to a high voltage level of a gate signal.

16. An electronic device comprising:

a display panel including pixels, a display panel test circuit, and an electrostatic discharge protection circuit which are connected to a data line which transmits a data voltage;

a flexible circuit board which drives the display panel and outputs an electrostatic discharge low potential voltage; and a processor which controls the flexible circuit board, wherein the display panel test circuit includes an open-short test transistor including a gate electrode which receives a test gate signal, a first electrode which receives an open-short test voltage, and a second electrode connected to the data line, wherein the electrostatic discharge protection circuit includes:

a first electrostatic discharge diode including a cathode electrode connected to the data line and an anode electrode which receives a first voltage;

a first switching element which determines a minimum voltage of the display panel as the first voltage under a first condition and determines the electrostatic discharge low potential voltage higher than the minimum voltage of the display panel as the first voltage under a second condition; and a second electrostatic discharge diode including a cathode electrode which receives a second voltage and an anode electrode connected to the data line, and wherein a voltage difference between the data voltage and the electrostatic discharge low potential voltage is less than a voltage difference between the data voltage and the minimum voltage of the display panel.

17. The electronic device of claim 16, further comprising:

a pad which transmits the electrostatic discharge low potential voltage and is connected to the electrostatic discharge protection circuit and the flexible circuit board.

18. The electronic device of claim 16, wherein a distance between a first connection line connected to the data line and the open-short transistor and a second connection line, which transmits the first voltage and is connected to the first switching element, is greater than or equal to an offset distance.

19. The electronic device of claim 16, wherein a distance between a second connection line, which transmits the first voltage and is connected to the first switching element, and a third connection line, which transmits the second voltage and is connected to the second electrostatic discharge diode, is greater than or equal to an offset distance.

20. The electronic device of claim 16, wherein the electrostatic discharge protection circuit further includes a second switching element which determines a maximum voltage of the display panel as the second voltage under the first condition and determines an electrostatic discharge high potential voltage lower than the maximum voltage of the display panel under the second condition, and wherein the display panel test circuit, the first switching element, and the second switching element are arranged sequentially along the data line.

* * * * *